United States Patent Office 3,216,837
Patented Nov. 9, 1965

3,216,837
CERAMIC REFRACTORY AND METHOD
George D. McTaggart, Horseheads, N.Y., assignor to Corhart Refractories Company, Louisville, Ky., a corporation of Delaware
No Drawing. Filed June 27, 1963, Ser. No. 290,940
9 Claims. (Cl. 106—57)

This invention relates to sintered, or bonded, zircon ceramic refractory material and the method of making it. In particular, the invention relates to relatively dense bodies of sintered, or bonded, zircon refractory which are especially suitable for use in contact with molten borosilicate and soda-lime-silicate glasses in a continuous tank furnace or other glass melting container.

It is known that sintered refractory bodies composed essentially of zircon ($ZrSiO_4$) commonly yield a substantial evolution and formation of gas bubbles at the interface between molten silicate glass and the refractory (see U.S. Patent 2,919,209 to A. G. Bossard). These bubbles become trapped in the glass and result in a finished glass article containing the defects commonly known as blisters and seeds.

Previous efforts to inhibit or prevent the formation of the gas bubbles or blisters in the molten silicate glass resulted in the technique of introducing into the surface of a sintered, or bonded, zircon body a crystalline compound of an alkali metal and then heating the surface treated body to at least 1400° C. This technique produced a surface layer of up to about ¼ inch in depth containing a higher concentration of alkali oxide, which surface layer substantially inhibited formation of the undesirable gas bubbles in the molten silicate glass contacting the surface thereof.

However, these surface treated refractory bodies have been found to be subject to serious difficulties and shortcomings. It is not uncommon for cracks to occur in these bodies during service. The cracks are not generally such as to detrimentally affect the structural integrity of the tank lining or other refractory structure contacted by the molten glass, but when the molten glass penetrates into these cracks and contacts an untreated portion of these bodies, the characteristic gas bubbles are found to form in the molten glass at the location of these cracks. Moreover, the proper alkali metal oxide treatment for satisfactory inhibition of gas bubble formation is dependent upon the apparent porosity of the untreated sintered zircon body and upon the vagaries of the persons applying the crystalline alkali metal compounds to the surface of the untreated sintered zircon body. These factors have many times been found difficult to subject to uniformity and control necessary to yield successful results of avoiding blisters and/or seeds.

Earlier attempts to treat the entire zircon body to inhibit gas bubble formation were not very successful. The surface treatment technique was found incapable of introducing the alkali metal oxide substantially beyond a depth of about ¼ inch. When the crystalline alkali metal compounds (e.g. $Na_2CO_3$ or the thermal reaction product of zircon and $Na_2CO_3$) were thoroughly mixed with a refined zircon batch before its fabrication and sintering into the desired body, it was found that these crystalline compounds seriously interfered with deflocculation in slip casting thereby making it impossible to fabricate suitable bodies by this means. Another difficulty with the premixing of these crystalline alkali metal compounds in the slip batch was that most times the molded bodies would be destructively cracked after drying or firing. Moreover, pressed and fired zircon bodies made from the usual batches containing granular zircon and having crystalline alkali metal compounds mixed therein were found not to exhibit a materially diminished tendency for the formation of gas bubbles on contact with molten silicate glasses, e.g. borosilicate and soda-lime-silicate glass. Furthermore, some crystalline alkali metal compounds, such as $Na_2CO_3$, caused the zircon to decompose or dissociate into $ZrO_2$ and siliceous glass during firing, which decomposition or dissociation was found to materially reduce the corrosion resistance of the refractory bodies due to excessive amounts of the lesser refractory glass.

It is an object of this invention to provide a bonded zircon refractory and a method of making it that obviates and avoids the aforementioned difficulties and problems.

More particularly, it is an object of this invention to provide a sound, bonded zircon refractory body of a substantially uniform composition throughout that exhibits a greatly reduced, or substantially no, gas bubble formation (hereinafter referred to as "low blistering") in molten borosilicate and soda-lime-silicate glasses contacting the refractory.

It is another object of this invention to provide the aforementioned refractory body without any material amount of decomposed or dissociated zircon whereby the refractory possesses superior corrosion resistance in contact with molten borosilicate and soda-lime silicate glasses.

A further object of one aspect of this invention is to provide a novel method of making the aforementioned refractory body and utilizing a slip casting procedure whereby the low blistering, sintered refractory bodies have very low porosity with concomitant high density. These bodies are particularly suitable for side walls of tank furnaces and the like.

It is a still further object of another aspect of this invention to provide a method of making pressed blocks or bricks of sintered zircon refractory material exhibiting relatively low porosity and very low blistering in molten borosilicate and soda-lime-silicate glasses contacting the refractory bodies. These blocks or bricks are particularly suitable for bottom paving in continuous tank furnaces and the like.

Additional objects, features, and advantages of the present invention will become apparent, to those skilled in the art, from the following detailed description.

I have now discovered that sintered zircon bodies can be made of a substantially uniform composition throughout, and which composition is low-blistering in contact with molten borosilicate and soda-lime-silicate glasses by mixing together a refractory batch of commercial refined zircon in finely divided form and a special glass, the latter being preformed as such and finely divided before mixing with the refined zircon.

The special preformed glass for the refractory batch according to this invention consists essentially, on the oxide basis in weight percent (as determined by chemical analysis), of the following, stated in its broadest terms and in its preferred limits:

| Oxide | Broad | Preferred |
|---|---|---|
| $Na_2O$ | 10–20 | 10–15 |
| $ZrO_2$ | 15–25 | 15–25 |
| $SiO_2$ | 55–75 | 60–75 |
| $CaO+MgO$ | up to 2 | up to 2 |

The special glass may also contain insignificant incidental impurities and melting additives (e.g. $As_2O_3$, $Al_2O_3$, $TiO_2$, etc.) in amounts totaling less than 1% by weight of the glass. The CaO and/or MgO can be completely omitted when desired.

I have found that, when refractory bodies are made of a sintered, uniform mixture of refined zircon and an amount of the special preformed glass, as defined above, sufficient or effective to provide the sintered refractory bodies with a $Na_2O$ content of about 0.1% to 0.75% by weight, the preformed glass forms a compatible interstitial glass in the refractory bodies that inhibits gas bubble or blister formation in common commercial borosilicate and soda-lime-silicate glasses in contact with the refractory bodies. Optimum results are attained by providing a $Na_2O$ content in the sintered refractory bodies of about 0.3% to 0.5% by weight.

More particularly, a refractory body according to this invention will consist essentially of a sintered, uniform mixture of refined zircon and 0.5% to 7.5% by weight of the special preformed glass described above. For optimum low blistering characteristics, the special preformed glass should be 1.5% to 4% by weight of the sintered, uniform mixture.

By the steps of forming a uniform mixture of finely divided refined zircon and the finely divided preformed glass in proportions as described above, then molding this mixture by suitable means into a body of shape and size desired, and firing it to yield a strongly coherent sintered body, there is provided a novel method of producing low-blistering, sintered zircon refractory bodies. The molding step of this novel process, I have found, can be performed by two particularly suitable procedures (although the invention is not necessarily limited thereto) that ultimately yield the heretofore unobtainable sound, corrosion resistant, sintered zircon refractory bodies of a uniform composition throughout that exhibit low-blistering in contact with molten borosilicate and soda-lime-silicate glasses, which are made possible by the inclusion of the special preformed glass. The first of these procedures involves slip casting to produce bodies with very low porosity and concomitant high density. The second involves pressing to produce bodies with relatively low porosity, but not quite as low as is possible with the slip casting procedure. Both procedures will be more fully described below.

There are several factors that make the special preformed glass composition critically important to obtaining the novel results of this invention, all but the last one mentioned below applicable to the invention in general.

The first factor is that the $ZrO_2$ content of at least 10% in the preformed glass acts to inhibit decomposition or dissociation of the zircon to zirconia and siliceous glass. Generally the decomposition or dissociation is inhibited to the extent of almost non-existence. As a result, the refractory according to this invention avoids the formation of excessive interstitial glass in the body along with the concomitant results of rapid corrosion wear of the refractory body and stone contamination of the contact glass. The latter results occur due to the more rapid removal of the excessive interstitial glass by the contact glass thereby allowing looser bonded zircon grains to float free of the refractory body.

It is also important to note that the content of CaO plus MgO in the preformed glass should not exceed about 2%; otherwise excessive quantities of these constituents will nullify the inhibiting effect of the $ZrO_2$ content.

A second factor of importance concerning the special preformed glass is that it readily reacts during firing with the impurities and free $SiO_2$ (including coarse fractions of free $SiO_2$ that are present in pressing batches) in the refined zircon and takes them into solution to form one compatible (i.e. low-blistering) interstitial glass, which result is not accomplished with crystalline $Na_2O$ containing compounds (such as $Na_2CO_3$ or the thermal reaction product of zircon and $Na_2CO_3$) and especially so when the batch mixture contains coarse fractions of free $SiO_2$. This unique result is thought to be attainable at least partly due to the greater fluidity (i.e. lower viscosity) of the preformed glass at firing temperatures than that of the crystalline compounds. Without the novel addition of the special preformed glass, the free $SiO_2$ and impurities in the zircon form a noncompatible interstitial glass (i.e. one that readily yields blisters in the contact glass). In connection with this factor, it is important to keep the $ZrO_2$ content of the preformed glass from exceeding about 25% in order to avoid devitrification and the attendant defects resulting from use of crystalline $Na_2O$-containing compounds.

A last factor, having bearing on the slip casting procedure mainly, is that the $Na_2O$ content of the preformed glass is only slightly soluble in aqueous acid solution provided the $Na_2O$ content does not substantially exceed 20%. In attempts using $Na_2CO_3$ or the crystalline thermal reaction product of zircon and $Na_2CO_3$, it was found that the highly soluble $Na_2O$ contents of these materials interferred with and prevented proper deflocculation of the slip, making it impossible to cast usable bodies. However, no defluocculation difficulties were encountered as a result of using the special preformed glass with its highly insoluble $Na_2O$ contents. In connection with this factor, it is also important to keep the $ZrO_2$ content of the preformed glass from exceeding about 25% in order to avoid devitrification and rendering the $Na_2O$ content soluble in aqueous acid solution.

It should also be noted that the $Na_2O$ content of the preformed glass should amount to at least about 10% in order to provide adequate compatibility between the refractory and the contact glass whereby blister formation is reduced to a very low degree.

The slip casting procedure comprises forming an aqueous slip of the zircon and glass mixture described above. Sufficient water, acid and, if necessary, other deflocculant is mixed with the zircon-glass mixture to produce a slip with a pH of 4.7 to 6.5 and a consistency similar to molasses or thick cream. Generally, keeping the slip flow rate less than 60 seconds gives good results. The amount of water to be added depends upon the particle size of the zircon-glass mixture. Bodies of good density were made with finely divided preformed glass having a particle size of —100 mesh (Tyler). The finely divided refined zircon was either entirely —325 mesh (Tyler) or additionally contained coarser zircon fractions up to 30% of the total zircon. The coarser fractions were in the form of —14 +35 mesh (Tyler) refined zircon grog or —65 +250 commercially available granular refined zircon. With these materials, suitable water contents varied from 16% to 12% by weight of the dry zircon-glass mixture as the amount of coarse fraction zircon increased to 30%.

The acid used for adjusting the pH of the slip to the proper value can be any acid commonly used for such purposes in the slip casting art. Tartaric acid was used in the production of the slip cast examples shown in Table I.

In those cases where the preformed glass provides 0.3% or less $Na_2O$ to the sintered body, it is preferred to add very small amounts of a deflocculant, such as sodium silicate or sodium alginate (soda containing algae), the latter sold under the trade name "Keltex" by Kelco Company, Clark, New Jersey, to insure complete and stable deflocculation.

The slip cast examples shown in Table I were made by casting the above-described slips into conventional plaster of Paris molds, removing and drying, preferably by heating to a temperature below the boiling point of water, and then firing at a temperature of at least 1500° C. (preferably 1550°–1600° C.). Time at the firing temperature was at least 16 hours.

The refined zircon used was a commercial purified ore grade having a typical chemical analysis as follows, in weight percent:

| | | | |
|---|---|---|---|
| $Na_2O$ | 0.005 | $Fe_2O_3$ | 0.05 |
| $K_2O$ | 0.003 | $TiO_2$ | 0.2 |
| CaO | 0.002 | $Al_2O_3$ | 0.08 |
| MgO | 0.002 | Free $SiO_2$ | 1–3 |

The remainder of the material was zircon, except for the usual hafnia. As is well known, hafnium is commonly found in zirconium-bearing ores usually amounting to 1–8% and is extremely difficult as well as expensive to remove from the ore. It has been found that, in these ore materials, hafnium is so indistinguishable from zirconium in its physical properties and chemical behavior that for practical purposes it is considered as zirconium.

The composition of the preformed glasses used in the examples of Tables I and III were as follows, in weight percent on an oxide basis:

| Glass | Na$_2$O | ZrO$_2$ | SiO$_2$ | Other |
|---|---|---|---|---|
| A | 14.40 | 15.34 | 69.57 | *0.68 |
| B | 12.5 | 15.0 | 72.5 | |

*Includes 0.5% As$_2$O$_3$, 0.11% Al$_2$O$_3$, 0.07% TiO$_2$.

Sections of the example blocks of Table I were preheated at 1400° C. and then partially covered with a molten commercial borosilicate glass at 1400° C. for 15 minutes. The composition of this contact glass was approximately (by weight): 80% SiO$_2$, 1.9% Al$_2$O$_3$, 14% B$_2$O$_3$ and 4.1% Na$_2$O. Upon cooling, the effectiveness of the refractory body composition to inhibit blistering is carefully estimated from the number of bubbles formed near the refractory glass interface with the number formed with the body made without any of the novel preformed glass indicating zero percent effectiveness and a complete absence of bubbles indicating 100% effectiveness. Effectiveness ratings are given for sections cut from the original sintered block surface and from the interior of the same block.

stances for pressing finely divided ceramic refractory materials. The lubricant and binder may be one and the same substance, e.g. aqueous solution of a water soluble polyethylene glycol. Next, this mixture is compacted under a load of at least 4000 p.s.i. (or as low as 100 p.s.i. if the mixture is vibrated in the mold before and/or during compaction) and then dried in the same manner as the slip cast bodies before firing. Firing temperatures are the same as those for the slip cast bodies with 1550°–1600° C. for at least 16 hours being preferred.

It is important that the different zircon fractions be maintained in the ranges specified; otherwise, it will not be possible to obtain low-porosity bodies suitable for service in contact with molten glass. When only the previously described granular zircon (−65 +250 mesh) is used in the coarse fraction, best results are obtained with a coarse fraction of about 70%. The total amount of coarse fraction is preferably reduced when part of it is made up of coarser zircon grog (−14 +35 mesh).

The pressed examples shown in Table III were made by mixing the listed ingredients and proportions in 400 gram batches. Next, 15 ml. of a 20% aqueous solution of 20M Carbowax was thoroughly mixed into each batch. The 20M Carbowax is a waxy solid, water soluble polyethylene glycol manufactured by the Union Carbide Corporation and commonly used as a binder in molding ceramic materials. The mixed batch materials were then pressed at about 4000 p.s.i. in a 2¼″ diameter mold to yield discs approximately 1″ to 1½″ thick. These discs were dried for about 16 hours at 38°–66° C. and then fired as indicated above.

Table I

| Block | −325 zircon | Granular zircon | Zircon grog | Preformed glass | Percent Na$_2$O in block | Percent effectiveness | |
|---|---|---|---|---|---|---|---|
| | | | | | | Surface | Interior |
| 0 | 100 | | | | | 0 | 0 |
| 1 | 89.33 | 10 | | 0.67A | 0.1 | 76–76 | 68–74 |
| 2 | 88.66 | 10 | | 1.34A | 0.2 | 50–50 | 88–90 |
| 3 | 88.00 | 10 | | 2.00A | 0.3 | 80–78 | 85–90 |
| 4 | 87.33 | 10 | | 2.67A | 0.4 | 86–92 | 90–93 |
| 5 | 86.67 | 10 | | 3.33A | 0.5 | 74–76 | 94–95 |
| 6 | 89.2 | 10 | | 0.8B | 0.1 | 25–30 | 82–84 |
| 7 | 88.4 | 10 | | 1.6B | 0.2 | 85–88 | 92–93 |
| 8 | 87.6 | 10 | | 2.4B | 0.3 | 88–90 | 85–86 |
| 9 | 86.8 | 10 | | 3.2B | 0.4 | 86–90 | 92–94 |
| 10 | 86.0 | 10 | | 4.0B | 0.5 | 84–85 | 94–95 |
| 11 | 96.67 | | | 3.33A | 0.5 | 86–90 | 94–94 |
| 12 | 96.00 | | | 4.0B | 0.5 | 84–84 | 92–94 |
| 13 | 76.67 | 20 | | 3.33A | 0.5 | 88–90 | 88–93 |
| 14 | 76.0 | 20 | | 4.0B | 0.5 | 86–88 | 92–97 |
| 15 | 87.33 | | 10 | 2.67A | 0.4 | 92–99 | 87–90 |
| 16 | 86.67 | | 10 | 3.33A | 0.5 | 75–88 | 88–94 |

While the foregoing examples illustrate the strong blister-inhibiting effect of glasses A and B, several other preformed glasses may be mentioned for illustration purposes as being suitable for the present invention. They are shown in Table II.

Table II

| Glass | Na$_2$O | ZrO$_2$ | SiO$_4$ |
|---|---|---|---|
| C | 10 | 15 | 75 |
| D | 15 | 20 | 65 |
| E | 12.5 | 20 | 67.5 |
| F | 10 | 20 | 70 |
| G | 15 | 25 | 60 |
| H | 12.5 | 25 | 62.5 |
| I | 10 | 25 | 65 |

The pressing procedure comprises forming the previously described zircon-preformed glass mixtures with 60% to 75% of the zircon being a coarse granular fraction of +250 mesh (Tyler) and the remaining 40% to 25% being a pulverulent fraction of −325 mesh (Tyler). The zircon fractions and preformed glass are uniformly mixed with conventional lubricant and binder sub-

Table III

| Disc | −325 zircon | −65+250 zircon | CaO* | Preformed glass | Percent Na$_2$O in block | Percent effectiveness on surface |
|---|---|---|---|---|---|---|
| 17 | 26.0 | 70.0 | 2.0 | 2.0A | 0.3 | 80–85 |
| 18 | 30.0 | 67.75 | 0.25 | 2.0A | 0.3 | 72–75 |
| 19 | 30.0 | 67.50 | 0.50 | 2.0A | 0.3 | 76–78 |
| 20 | 30.0 | 67.25 | 0.75 | 2.0A | 0.3 | 80–82 |
| 21 | 30.0 | 67.0 | 1.0 | 2.0A | 0.3 | 78–82 |
| 22 | 30.0 | 66.0 | 2.0 | 2.0A | 0.3 | 86–86 |

* Reagent grade.

The effectiveness ratings for the example discs of Table III were determined in the same manner as the slip cast block sections of Table I except that the molten contacting glass used was a common commercial soda-lime glass having the following approximate composition (by weight): 73.4% SiO$_2$, 16.4% Na$_2$O, 0.3% K$_2$O, 1.45% Al$_2$O$_3$, 5.0% CaO and 3.45% MgO.

Although the present invention has been described with respect to specific details of certain embodiments thereof, it is not intended that such details be limitations up-

What is claimed is:

1. A sintered refractory body consisting essentially of a sintered uniform mixture of refined zircon and a glass having a composition consisting essentially, on the oxide basis in weight percent, of about 10% to 20% $Na_2O$, 15% to 25% $ZrO_2$, 55% to 75% $SiO_2$ and not more than about 2% of CaO plus MgO, the glass being included in an amount effective to provide the body with a $Na_2O$ content of about 0.1% to 0.75% by weight.

2. A sintered refractory body consisting essentially of a sintered uniform mixture of refined zircon and 0.5% to 7.5% by weight of a glass having a composition consisting essentially, on the oxide basis in weight percent, of about 10% to 20% $Na_2O$, 15% to 25% $ZrO_2$, 55% to 75% $SiO_2$ and not more than about 2% of CaO plus MgO.

3. A sintered refractory body consisting of a sintered uniform mixture of refined zircon and a glass having a composition consisting essentially, on the oxide basis in weight percent, of about 10% to 15% $Na_2O$, 15% to 25% $ZrO_2$, 60% to 75% $SiO_2$ and not more than about 2% of CaO plus MgO, the glass being included in an amount effective to provide the body with a $Na_2O$ content of about 0.3% to 0.5% by weight.

4. A sintered refractory body consisting of a sintered uniform mixture of refined zircon and 1.5% to 4% by weight of a glass having a composition consisting of essentially, on the oxide basis in weight percent, of about 10% to 15% $Na_2O$, 15% to 25% $ZrO_2$, 60% to 75% $SiO_2$ and up to about 2% CaO plus MgO.

5. A sintered refractory body according to claim 4 wherein said glass contains 0.25% to 2% by weight of CaO plus MgO.

6. The method of making a refractory body which comprises uniformly mixing finely divided refined zircon with a finely divided glass, said glass being included in an amount effective to provide the body with a $Na_2O$ content of about 0.1% to 0.75% by weight and consisting essentially, on the oxide basis in weight percent, of about 10% to 20% $Na_2O$, 15% to 25% $ZrO_2$, 55% to 75% $SiO_2$ and not more than about 2% of CaO plus MgO, molding the mixture to form a body of desired shape and size and firing it at an elevated temperature sufficient to sinter it into a strongly coherent state.

7. The method of making a refractory body which comprises uniformly mixing finely divided refined zircon with a finely divided glass, said glass comprising 0.5% to 7.5% by weight of the mixture and consisting essentially on the oxide basis in weight percent, of about 10% to 20% $Na_2O$, 15% to 25% $ZrO_2$, 55% to 75% $SiO_2$ and not more than about 2% of CaO plus MgO, molding the mixture to form a body of desired shape and size, and firing it at an elevated temperature sufficient to sinter it into a strongly coherent state.

8. The method of making a refractory body which comprises forming a uniformly mixed aqueous slip with a mixture of finely divided refined zircon and finely divided glass, said glass comprising 0.5% to 7.5% by weight of said mixture and consisting essentially on the oxide basis in weight percent, of about 10% to 20% $Na_2O$, 15% to 25% $ZrO_2$, 55% to 75% $SiO_2$ and not more than about 2% of CaO plus MgO, adjusting the pH of the slip to between 4.7 and 6.5, casting the slip to form a body of desired shape and size, drying and firing it at an elevated temperature sufficient to sinter it into a strongly coherent state.

9. The method of making a refractory body which comprises forming a pressure moldable, uniform mixture of finely divided refined zircon, finely divided glass, binder and lubricant, 60% to 75% of said zircon being composed of a coarse fraction of +250 mesh (Tyler) and the remainder of said zircon being composed of a pulverulent fraction of —325 mesh (Tyler), said glass comprising 0.5% to 7.5% by weight of the total zircon plus glass and consisting essentially, on the oxide basis in weight percent, of about 10% to 20% $Na_2O$, 15% to 25% $ZrO_2$, 55% to 75% $SiO_2$ and not more than about 2% of CaO plus MgO, compacting said mixture to form a body of desired shape and size, drying and firing it at an elevated temperature sufficient to sinter it into a strongly coherent state.

References Cited by the Examiner

UNITED STATES PATENTS 2,880,097    3/59    Emhiser _____ 106—57

TOBIAS E. LEVOW, *Primary Examiner.*